US010117245B2

(12) United States Patent
Liu et al.

(10) Patent No.: US 10,117,245 B2
(45) Date of Patent: Oct. 30, 2018

(54) TRANSMISSION APPARATUS AND TRANSMISSION METHOD

(71) Applicant: Panasonic Corporation, Osaka (JP)

(72) Inventors: Weijie Liu, Kanagawa (JP); Masakazu Nishino, Osaka (JP); Toyoki Kawahara, Tokyo (JP); Ken Naka, Tokyo (JP); Yoshio Urabe, Nara (JP); Junichi Morita, Tokyo (JP)

(73) Assignee: Panasonic Corporation, Osaka (JP)

(*) Notice: Subject to any disclaimer, the term of this patent is extended or adjusted under 35 U.S.C. 154(b) by 155 days.

(21) Appl. No.: 14/400,535

(22) PCT Filed: Mar. 6, 2014

(86) PCT No.: PCT/JP2014/001254
§ 371 (c)(1),
(2) Date: Nov. 11, 2014

(87) PCT Pub. No.: WO2014/141645
PCT Pub. Date: Sep. 18, 2014

(65) Prior Publication Data
US 2015/0181602 A1    Jun. 25, 2015

(30) Foreign Application Priority Data
Mar. 13, 2013  (JP) ................. 2013-050666

(51) Int. Cl.
H04W 72/04  (2009.01)
H04W 74/02  (2009.01)
(Continued)

(52) U.S. Cl.
CPC ....... H04W 72/0453 (2013.01); H04W 72/10 (2013.01); H04W 74/02 (2013.01); H04W 74/0866 (2013.01); H04W 88/06 (2013.01)

(58) Field of Classification Search
CPC ............ H04W 72/10; H04W 72/1215; H04W 72/1242
(Continued)

(56) References Cited

U.S. PATENT DOCUMENTS

2006/0291402 A1* 12/2006 Yun ...................... H04W 28/06
                                                          370/252
2011/0065440 A1*  3/2011 Kakani ................. H04L 1/0022
                                                          455/450
2013/0136001 A1*  5/2013 Mese ...................... H04W 4/18
                                                          370/235

FOREIGN PATENT DOCUMENTS

JP    2005-328406 A   11/2005
JP    2005-328409 A   11/2005
(Continued)

OTHER PUBLICATIONS

International Search Report, dated Jun. 10, 2014, for International Application No. PCT/JP2014/001254, 2 pages.

Primary Examiner — Dmitry Levitan
(74) Attorney, Agent, or Firm — Seed IP Law Group LLP

(57) ABSTRACT

A transmission apparatus includes a first transmission section for transmitting communication data using a first communication path in which band control is performed using a dedicated band and an undedicated band; a second transmission section for transmitting communication data using a second communication path in which priority control is performed depending on the priority of communication data; a switching control section for performing switching between the transmission using the first transmission section and the transmission using the second transmission section; and a parameter setting section for setting communication parameters for performing communication using the second communication path in the case that switching is performed
(Continued)

from the transmission using the first transmission section to the transmission using the second transmission section.

16 Claims, 12 Drawing Sheets

(51) Int. Cl.
*H04W 72/10* (2009.01)
*H04W 74/08* (2009.01)
*H04W 88/06* (2009.01)

(58) Field of Classification Search
USPC .......................................... 370/310, 464, 465
See application file for complete search history.

(56) References Cited

FOREIGN PATENT DOCUMENTS

| | | |
|---|---|---|
| JP | 2007-006497 A | 1/2007 |
| JP | 2012-186701 A | 9/2012 |

\* cited by examiner

FIG. 12

| ACCESS CATEGORY | AIFSN | CWmin-CWmax | TXOP |
|---|---|---|---|
| AC_VI | 2 | 3-7 | 1.5ms |
| AC_VO | 2 | 7-15 | 3ms |
| AC_BE | 3 | 15-1023 | 1FRAME |
| AC_BK | 7 | 15-1023 | 1FRAME |

TRANSMISSION APPARATUS AND TRANSMISSION METHOD

TECHNICAL FIELD

The present disclosure relates to a transmission apparatus and a transmission method.

BACKGROUND ART

Conventionally, as communication among a plurality of communication apparatuses, communication using a QoS (Quality of Service) function (for example, a priority control function) has been widespread. For example, EDCA (Enhanced Distributed Channel Access) is included in a priority control system.

As apparatuses employing the conventional EDCA communication system, an apparatus for adjusting EDCA parameters is known (for example, refer to Patent Document 1). The apparatus described in Patent Document 1 measures the number of communication terminals and the load amount of real-time communication for each access category (i.e. type of priority) in the setting of the EDCA parameters adapted to a communication environment and simulates the communication environment. This apparatus obtains EDCA parameters for shortening the delay time of real-time data or increasing the processing amount of non-real-time data according to the simulation result of the communication environment.

PRIOR ART DOCUMENT

Patent Document

Patent Document 1: JP-A-2007-006497

GENERAL DESCRIPTION OF THE INVENTION

Problem that the Invention is to Solve

In the apparatus according to Patent Document 1, there is a possibility that communication quality will be degraded in the case that communication is switched from short-range wireless communication using a millimeter wave (hereafter simply referred to as "millimeter wave communication") to communication using a microwave (hereafter simply referred to as "microwave communication").

In consideration of the above-mentioned circumstances, the present disclosure provides a transmission apparatus and a transmission method capable of improving communication quality in the case that millimeter wave communication is switched to microwave communication.

Means for Solving the Problem

The transmission apparatus according to the present disclosure is equipped with a first transmission section that transmits communication data using a first communication path in which band control is performed using a dedicated band and an undedicated band; a second transmission section that transmits communication data using a second communication path in which priority control is performed depending on the priority of communication data; a switching control section that performs switching between the transmission using the first transmission section and the transmission using the second transmission section; and a parameter setting section that sets communication parameters for performing communication using the second communication path in the case that switching is performed by the switching control section from the transmission using the first transmission section to the transmission using the second transmission section.

Advantage of the Invention

With the present disclosure, communication quality in the case that switching is performed from millimeter wave communication to microwave communication can be improved.

BRIEF DESCRIPTION OF THE DRAWINGS

FIG. 12 is a schematic diagram showing the recommended values of EDCA parameters for respective access categories.

MODE FOR CARRYING OUT THE INVENTION

Figure 1:
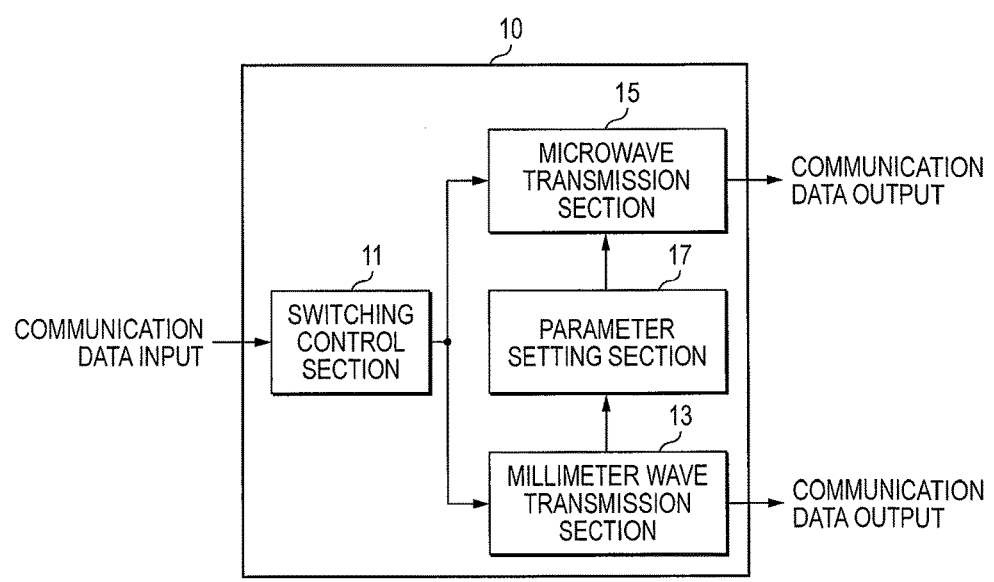
FIG. 1 is a block diagram showing a configuration example of a transmission apparatus according to a first embodiment.

Embodiments according to the present disclosure will be described below referring to the drawings.

(Circumstances Leading to an Embodiment According to the Present Disclosure)

In recent years, for example, as mobile terminals become highly functional or video contents become HD (High Density), high-quality video files or large-volume files are beginning to be communicated also in mobile terminals. In this communication environment, a communication terminal is requested to communicate large-volume files at high speed between the communication terminal and the communication terminal of its communication partner.

As a high-speed communication method, millimeter wave communication is attracting attention. Millimeter wave communication is a communication standard in which communication can be made at a throughput of 1 Gigabits or more per second. Millimeter wave communication is expected as communication to be used between mobile terminals instead of infrared communication or expected to serve as a role for reducing the traffic of a public wireless network.

For the wide spread use of millimeter wave communication in the future, the coexistence of millimeter wave communication and communication using the existing microwave wireless LAN (Local Area Network) (hereafter referred to as wireless LAN communication) is required. It is herein assumed that the microwave communication does not include millimeter wave communication. It is supposed that the millimeter wave communication function and the wireless LAN communication function are generally provided simultaneously for millimeter wave communication terminals (for example, mobile communication terminals).

Millimeter wave communication is shorter in communication distance and higher in directivity than wireless LAN communication although super high speed communication is possible. Hence, the increase and decrease in throughput during communication are significant, and it is assumed that communication may be interrupted in the middle of communication depending on the usage. Furthermore, the cooperation between millimeter wave communication and wireless LAN communication is important, and in particular, seamless switching between millimeter wave communication and wireless LAN communication is important.

For example, in IEEE (Institute of Electrical and Electronic Engineers) 802.11ad serving as a WiFi (Wireless Fidelity) standard for millimeter wave communication, communication is performed using a 60 GHz frequency band. In IEEE802.11n serving as a WiFi standard for wireless LAN communication, communication is performed using a 5 GHz or 2.4 GHz frequency band.

FST (Fast Session Transfer) is standardized as a system for performing seamless switching (switching from the 60 GHz frequency band to the 5 GHz/2.4 GHz frequency band or switching in the opposite direction) between millimeter wave communication and wireless LAN communication. FST is described in the following reference and is attracting attention as a standard for supplementing millimeter wave communication.

(Reference: IEEE802.11ad-2012, IEEE, December 2012)

In order that a communication terminal provided with the millimeter wave communication function and the wireless LAN communication function utilizes the high-speed performance of millimeter wave communication to the maximum extent, it is necessary to make up for vulnerability to interruption of millimeter wave communication and to perform smooth switching from millimeter wave communication to wireless LAN communication. For example, FST is used for this switching. In particular, in the case that real-time communication (for example, video streaming communication) is executed, it is necessary to maintain the real-time characteristic thereof. For the maintenance of the real-time characteristic, the way of how to allocate a communication band is important.

Since the number of communication terminals performing millimeter wave communication simultaneously is usually few, dedicated bands are allocated frequently for millimeter wave communication. In other words, in the case of millimeter wave communication, a dedicated transmission band is allocated to the application operating in each communication terminal, in particular, to the communication data of an application requiring a real-time characteristic.

On the other hand, in the case of wireless LAN communication, numerous communication terminals sometimes communicate simultaneously with one access point in a wide range. Furthermore, no dedicated band is allocated in many cases to avoid the influence of interference. In wireless LAN communication, a priority band allocation system (priority control) for giving priority to communication data is generally used.

In the case of the priority band allocation system, communication data is classified into, for example, a plurality of access categories (AC: Access Categories). The relative priorities among the access categories are determined, for example, according to EDCA parameters and are differentiated, for example, according to the probability of transmission right acquisition or the length of transmission time.

Figure 11:
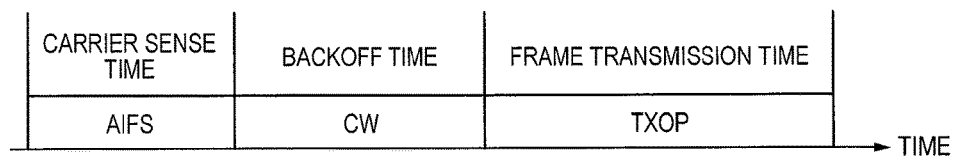
FIG. 11 is a schematic diagram showing the time allocation in the EDCA system.

FIG. 11 is a schematic diagram showing the basic system of EDCA. The times to be used for EDCA include a carrier sense time AIFS (Arbitration InterFrame Space) and a backoff time CW (Contention Window). In addition, the times to be used for EDCA include a frame transmission time TXOP (Transmission Opportunity).

In the case that a communication request is generated, the communication terminal detects the state of a channel after the carrier sense time AIFS has passed. In the case that the channel is in an idle state as the result of the detection, the communication terminal generates the backoff time CW at random and starts the countdown of the backoff time CW. The communication terminal acquires a transmission right at the time when the count of the backoff time CW becomes 0 and transmits/receives frames within the frame transmission time TXOP serving as a designated transmission time. After the designated transmission time has passed, in the case that a communication request is present, the communication terminal performs carrier sense again and competes to acquire the transmission right.

In IEEE802.11e serving as a WiFi standard to be used for wireless LAN communication, four access categories (AC_VO, AC_VI, AC_BE and AC_BK) are specified according to priority.

AC_VO is an abbreviation of Access Category_Voice. AC_VI is an abbreviation of Access Category_Video. AC_BK is an abbreviation of Access Category_Best Effort. AC_BE is an abbreviation of Access Category_Background.

AC_VO and AC_VI are data requiring a real-time characteristic and are, for example, voice data or video data (image data). AC_BE and AC_BK are non-real-time data (not requiring a real-time characteristic).

FIG. 12 is a schematic diagram showing the recommended values of EDCA parameters. For the four access categories of EDCA, respectively different EDCA parameter values are recommended. AIFSN (Arbitration InterFrame Space Number) designates the carrier sense time AIFS. The carrier sense time AIFS is derived from an AIFSNX slot time. CWmin indicates the minimum value of a backoff random value, and CWmax indicates the maximum value of the backoff random value. The frame transmission time TXOP designates the length of the transmission time after the acquisition of the transmission right.

The recommended value of an EDCA parameter may not be the best parameter value in an individual communication environment in some cases. For example, in Patent Document 1, a technology for obtaining optimal EDCA parameters for a communication environment has been proposed.

Although EDCA parameters are adaptively set in the apparatus according to Patent Document 1, EDCA parameters are set by measuring the present communication environment. Furthermore, in the case that millimeter wave communication is switched to microwave communication, before the switching, it is necessary to set EDCA parameters to be used after the switching. Hence, in the case that millimeter wave communication is switched to microwave communication, it is difficult to measure the communication environment to be obtained after the switching, and before the switching, it is difficult to properly set EDCA parameters to be used after the switching.

Moreover, Patent Document 1 is intended for a communication environment in which numerous communication terminals communicate with a single access point. For this reason, a simulation method has been used to grasp all the situations of the numerous communication terminals in which transmission timing is controlled autonomously. However, in the switching from millimeter wave communication to microwave communication, it cannot be said that simulation is an effective means. The reason for this is that since the communication environment after the switching is not supposed, the hypothetical conditions for simulation increase and calculation amounts increase to obtain highly accurate results.

A transmission apparatus and a transmission method capable of improving communication quality in the case that millimeter wave communication is switched to microwave communication will be described below.

First Embodiment

FIG. 1 is a block diagram showing a configuration example of a transmission apparatus 10 according to a first embodiment. The transmission apparatus 10 includes a switching control section 11, a millimeter wave transmission section 13, a microwave transmission section 15, and a parameter setting section 17. For example, a sensor having a wireless communication function is assumed to serve as the transmission apparatus 10.

The input data of the transmission apparatus 10 is, for example, communication data to be transmitted to a communication partner. The communication data is generated in real time by predetermined application software (not shown), or data stored in predetermined memory (not shown) is acquired and the communication data is generated from the acquired data.

Furthermore, the communication data may be processed until the data is input to the transmission apparatus 10. For example, the header information of a predetermined communication protocol may be added to the communication data. The methods for generating and processing the communication data and the format of the communication data are not limited.

The switching control section 11 selects a communication path through which the communication data is transmitted. For example, in the case that the communication state of a millimeter wave communication path is satisfactory, the switching control section 11 selects the millimeter wave communication path. The millimeter wave communication path is a communication path to be used for millimeter wave communication and is an example of a first communication path in which band control is performed using a dedicated band or an undedicated band. The communication system of millimeter wave communication includes, for example, the SPCA (Service Period Channel Access) system.

Moreover, in the case that the communication state of the millimeter wave communication path is not satisfactory, the switching control section 11 selects a microwave communication path. The microwave communication path is a communication path to be used for microwave communication and is an example of a second communication path in which priority control is performed depending on the priority of communication data. The communication system of microwave communication includes, for example, the EDCA system. Microwave communication in this embodiment does not include millimeter wave communication.

The method for judging the communication state of a communication path is not limited. As known technologies, for example, a method in which statistical information (for example, the number of retransmission times) is used and a method in which the SNIR (Signal to Interference-plus-Noise Ratio) is measured are available.

The millimeter wave transmission section 13 transmits the communication data transferred from the switching control section 11 using the millimeter wave communication path. For example, the millimeter wave transmission section transmits the communication data in conformity with IEEE802.11ad standard.

The microwave transmission section 15 transmits the communication data transferred from the switching control section 11 using the microwave communication path. For example, the microwave transmission section transmits the communication data in conformity with IEEE802.11n standard. The communication frequency band of microwave communication includes, for example, 2.4 GHz band or a 5 GHz band.

The parameter setting section 17 acquires information on the band allocation state in millimeter wave communication from the millimeter wave transmission section 13. The information on the band allocation state for millimeter wave communication includes, for example, information on the number of communication traffic streams and the utilization state of a band to be allocated to each traffic stream.

In addition, the parameter setting section 17 sets parameters relating to microwave communication in the case of switching to microwave transmission. The parameters relating to microwave communication include the EDCA parameters for access categories indicating the types of traffic streams and serve as examples of communication parameters.

Figure 2:
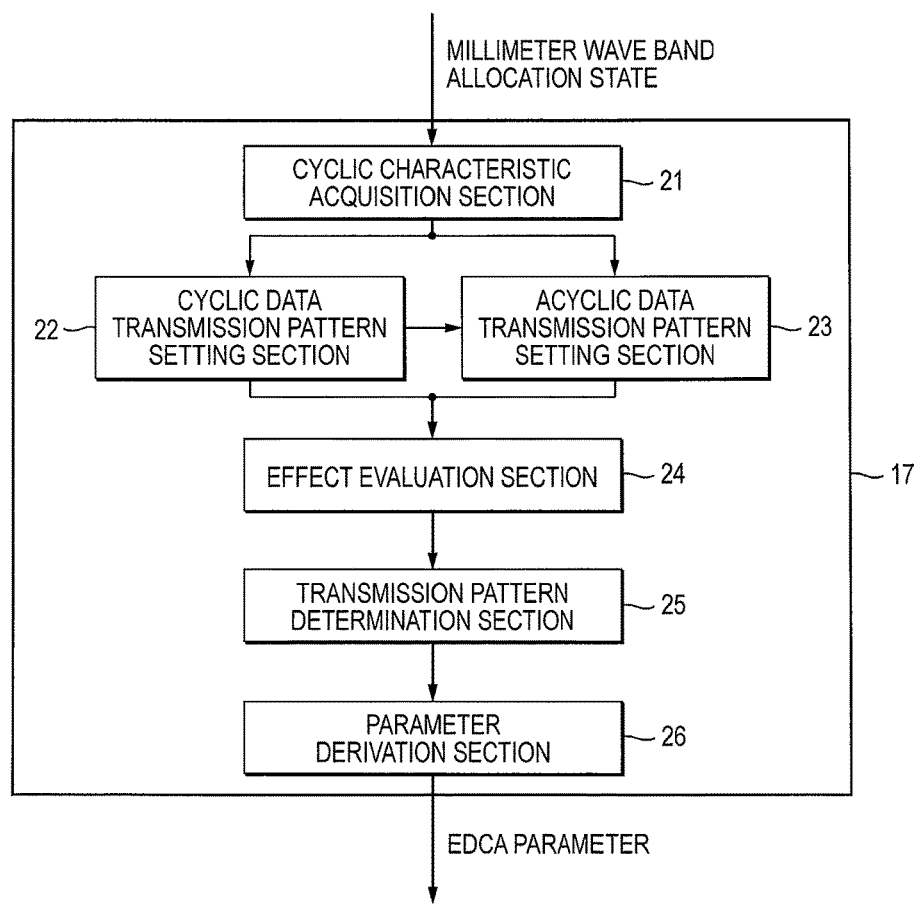
FIG. 2 is a block diagram showing a configuration example of a parameter setting section according to the first embodiment.

FIG. 2 is a block diagram showing a configuration example of the parameter setting section 17. The parameter setting section 17 includes a cyclic characteristic acquisition section 21, a cyclic data transmission pattern setting section 22, an acyclic data transmission pattern setting section 23, an effect evaluation section 24, a transmission pattern determination section 25, and a parameter derivation section 26.

On the basis of the band allocation state for millimeter wave communication, the cyclic characteristic acquisition section 21 extracts the cyclic characteristic of millimeter wave communication and derives the request of the cyclic characteristic for microwave transmission.

In millimeter wave communication, a dedicated band is provided, and communication data (hereafter also referred to as cyclic data) requiring a real-time characteristic and cyclically generating a transmission request is transmitted cyclically using the dedicated band. The cyclic characteristic acquisition section 21 extracts, for example, a cycle T at which the dedicated band appears repeatedly and the transmission amount transmitted by the millimeter wave transmission section 13 at the cycle T as a cyclic characteristic.

Furthermore, in microwave communication, unlike millimeter wave communication, no dedicated band is generally provided to prevent interference. The cyclic data to be transmitted in the dedicated band in millimeter wave communication is cyclically allocated to a predetermined band in microwave communication. The cyclic characteristic acquisition section 21 derives, for example, a cycle T in microwave communication and the transmission amount transmitted by the microwave transmission section 15 at the cycle T as the request of a cyclic characteristic.

Figure 3:
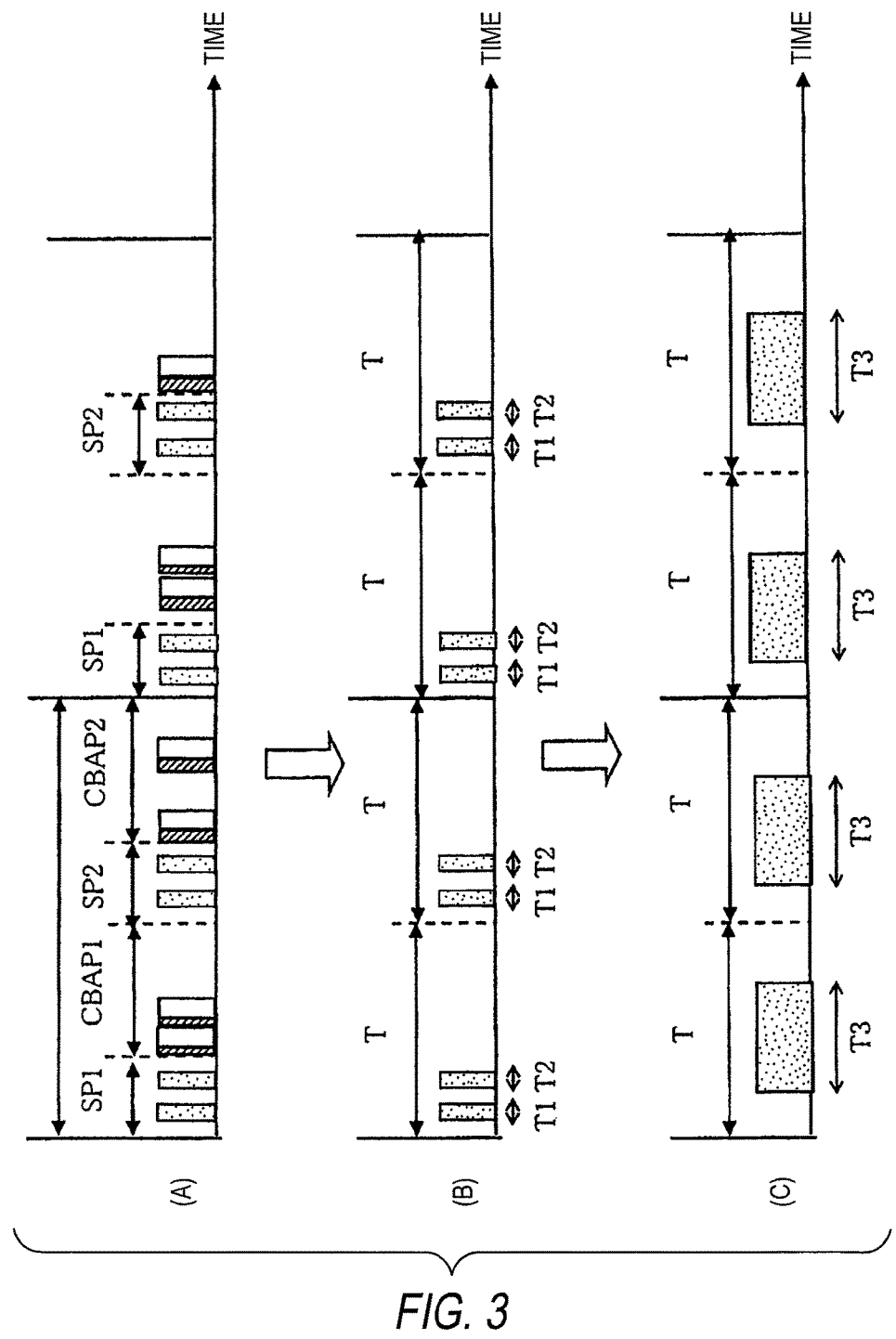
FIG. 3(A) is a schematic diagram showing an example of the band allocation state of millimeter wave communication according to the first embodiment.
FIG. 3(B) is a schematic diagram showing an example of the cyclic characteristic of millimeter wave communication according to the first embodiment.
FIG. 3(C) is a schematic diagram showing an example of the request of the cyclic characteristic for microwave communication according to the first embodiment.

FIGS. 3(A) to 3(C) are schematic diagrams illustrating processing examples of the cyclic characteristic acquisition section 21. FIG. 3(A) is a schematic diagram showing an example of the band allocation state (transmission state) for millimeter wave communication.

As the types of band allocation for millimeter wave communication, two types: SP (Service Period) and CBAP (Contention-Based Access Period) are included.

SP designates a dedicated band and is a dedicated transmission time given to designated communication data. Designated transmission data is communication data (hereafter also referred to as cyclic data) requiring a real-time characteristic and cyclically generating a transmission request. The cyclic data includes, for example, voice data (for example, communication data in the access category of AC_VO) and video data (for example, communication data in the access category of AC_VI).

CBAP designates a contention band (undedicated band) and is a transmission time acquired through contention for a plurality of communication data (for example, communication data not requiring a real-time characteristic (hereafter also referred to as acyclic data)). For example, EDCA is used for the contention of CBAP. The acyclic data includes, for example, communication data in the access category of AC_BE and communication data in the access category of AC_BK.

In FIG. 3(A), each of SP and CBAP is divided a plurality of times in one or more beacon cycles, and band allocation is performed. In FIG. 3(A), SP1 and SP2 are included in a beacon cycle, and also in the following beacon cycles, SP1 and SP2 are repeated in the same time zone. Furthermore, SP1 and SP2 may be subjected to band allocation only once in one or more beacon cycles. SP1 and SP2 may be allocated to, for example, the same application or may be allocated to different applications.

The band allocation of millimeter wave communication is determined, for example, by a PCP (Personal Basic Service Set (PBSS) Central Point) serving as a communication management terminal, not shown. In addition, for example, the lengths of the time zones of SP and CBAP and the number of the time zones of SP and CBAP are determined by PCP. Furthermore, the transmission apparatus 10 may request band allocation to PCP according to the data type of communication data, and PCP may determine band allocation, for example, by calculation. Moreover, PCP may receive information for band allocation from applications to be executed by the transmission apparatus 10 and may perform band allocation for each application.

FIG. 3(B) is a schematic diagram showing an example of the band allocation state in the millimeter wave communication of the cyclic data. FIG. 3(B) exemplifies a case in which the transmission time at a cycle T is divided into two, a transmission time T1 and a transmission time T2. The cycle T herein indicates a cycle in which the cyclic data is transmitted and is a half period of the beacon cycle.

FIG. 3(C) is a schematic diagram showing an example of the request of the cyclic characteristic of the cyclic data in the case of microwave communication. Since the transmission speed of microwave communication is usually lower than the transmission speed of millimeter wave communication, the transmission time T3 at the cycle T becomes longer. The transmission time T3 in microwave communication corresponds to the period for transmitting the communication data to be transmitted in the transmission time T1 and the transmission time T2 in millimeter wave communication.

The transmission time T3 does not include an overhead time (for example, a carrier sense time AIFS, a backoff time CW and a frame interval time in the EDCA parameters) serving as a transmission preparation time. The transmission time T3 corresponds to the period in which communication data is transmitted. The overhead time is different depending on the type (for example, access category) of communication data.

Since the EDCA parameters are used in microwave communication, the start time of the transmission time cannot be designated. In other words, although the transmission time T3 is indicated in FIG. 3(C), it does not mean the designation of the start time.

The band allocation of microwave communication is determined by, for example, an access point (AP: Access Point) serving as a communication management terminal, not shown.

The cyclic data transmission pattern setting section 22 sets the transmission patterns of the cyclic data to be communicated by microwave communication. The cyclic data transmission pattern setting section 22 is an example of a transmission pattern derivation section.

The acyclic data transmission pattern setting section 23 sets the transmission patterns of the acyclic data to be communicated using microwave communication. The setting section is an example of a transmission pattern derivation section.

The effect evaluation section 24 evaluates communication effects with respect to the various transmission patterns having been set by the cyclic data transmission pattern setting section 22 and the acyclic data transmission pattern setting section 23. The evaluation index of the communication effect in the effect evaluation section 24 includes, for example, a transmission throughput, a communication-band effective utilization factor or the scarcity of the number of access times N1 and N2.

In addition, the transmission patterns includes, for example, the combinations of the number of access times N1 and N2 to a communication channel and transmission times $T_{ONE}2$ and $T_{ONE}4$ (described later) per access (hereafter also referred to as one-time transmission times). The one-time transmission times $T_{ONE}2$ and $T_{ONE}4$ are transmission times including the overhead time. Furthermore, the transmission patterns may include information on the time arrangement of various communication data (for example, the arrangement of various communication data in FIG. 3(A)) on the basis of the number of access times N1 and N2 and the one-time transmission times $T_{ONE}2$ and $T_{ONE}4$.

The transmission patterns of the cyclic data are based on the number of access times N1 of the cyclic data and the one-time transmission time $T_{ONE}2$ of the cyclic data. The transmission patterns of the acyclic data are based on the number of access times N2 of the acyclic data and the one-time transmission time $T_{ONE}4$ of the acyclic data. As the number of access times N2 of the cyclic data and the one-time transmission time $T_{ONE}4$ of the acyclic data, candidate values are prepared in plural number. Hence, various variations of transmission patterns can be generated and different communication effects can be evaluated. Each transmission pattern is assumed to meet the request for the cyclic characteristic derived by the cyclic characteristic acquisition section 21 in microwave communication.

For example, the effect evaluation section 24 may evaluate that transmission patterns having small number of access times N1 and N2, that is, transmission patterns having long one-time transmission times $T_{ONE}2$ and $T_{ONE}4$, as satisfactory communication. In this case, it may be possible that communication efficiency can be improved by relatively shortening the overhead time.

Moreover, for example, the effect evaluation section 24 may compare and evaluate respective transmission patterns on the basis of the one-time transmission times $T_{ONE}2$ and $T_{ONE}4$ adapted to an actual communication environment. In this case, lowering of communication efficiency can be suppressed in consideration of the actual communication environment, for example, even if packet loss or retransmission of communication data occurs.

The effect evaluation section 24 may evaluate the communication effects on the basis of one-time transmission times $T_{ONE}1$ and $T_{ONE}3$, instead of the one-time transmission times $T_{ONE}2$ and $T_{ONE}4$.

On the basis of the evaluation result by the effect evaluation section 24, the transmission pattern determination section 25 determines the transmission patterns of the cyclic data and the transmission patterns of the acyclic data.

The parameter derivation section 26 derives the EDCA parameters corresponding to the transmission patterns determined by the transmission pattern determination section 25. For example, the parameter derivation section 26 extracts the one-time transmission time $T_{ONE}1$ and the number of access time N1 of the cyclic data and the one-time transmission time $T_{ONE3}3$ and the number of access time N2 of the acyclic data. The one-time transmission times $T_{ONE}1$ and $T_{ONE}3$ are transmission times not including the overhead time. Furthermore, the parameter derivation section 26 derives TXOP and CWmin in the EDCA parameters to be used for the cyclic data and derives TXOP and CWmin in the EDCA parameters to be used for the acyclic data.

The parameter derivation section 26 derives the TXOP for the cyclic data from the one-time transmission time $T_{ONE}1$ in the transmission patterns of the cyclic data. The parameter derivation section 26 may directly use the one-time transmission time $T_{ONE}1$ as the TXOP of the cyclic data meanwhile using a smaller CWmin value than that recommended for the access category AC_VI in the EDCA parameters (see FIG. 12).

Besides, the parameter derivation section 26 derives the TXOP of the acyclic data from the one-time transmission time $T_{ONE}3$ in the transmission patterns of the acyclic data. The parameter derivation section 26 may directly use the one-time transmission time $T_{ONE}3$ as the TXOP of the acyclic data meanwhile deriving the CWmin of the acyclic data from, for example, the following expression (1).

[Expression 1]

$$CWmin(\text{acyclic data}) = CWmin(\text{cyclic data}) \times N1/N2 \quad \text{(Expression 1)}$$

The EDCA parameters evaluated such that the communication effects thereof have predetermined levels or more can be set by deriving the TXOP and CWmin of the EDCA parameters corresponding to the transmission patterns determined by the transmission pattern determination section 25 as described above. Hence, communication quality can be maintained before and after the switching of communication.

Next, the details of the cyclic data transmission pattern setting section 22 will be described.

Figure 4:
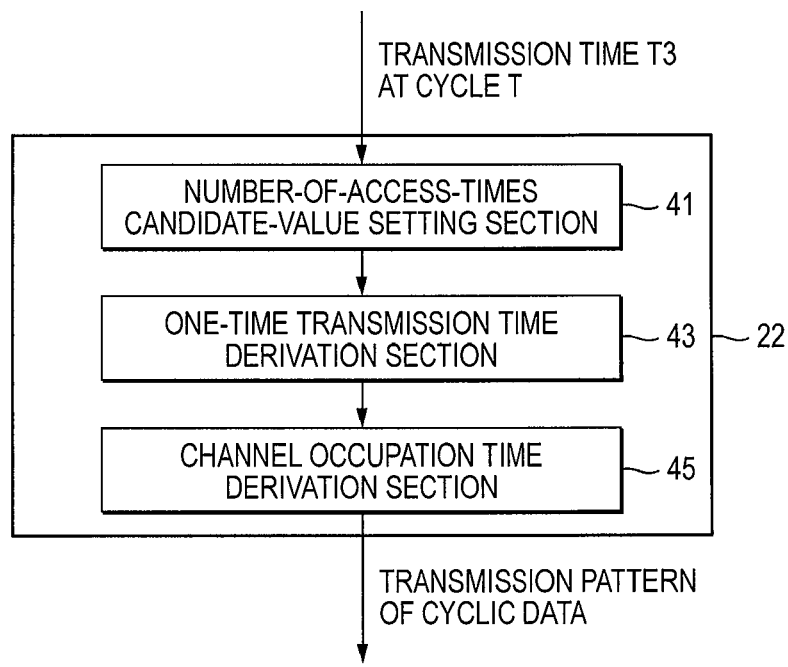
FIG. 4 is a block diagram showing a configuration example of a cyclic data transmission pattern setting section according to the first embodiment.

FIG. 4 is a block diagram showing a configuration example of the cyclic data transmission pattern setting section 22. The cyclic data transmission pattern setting section 22 includes a number-of-access-times candidate-value setting section 41, a one-time transmission time derivation section 43, and a first-channel occupation time derivation section 45.

The number-of-access-times candidate-value setting section 41 sets the candidate values of the number of times (the number of access times N1) the transmission time T3 of the cyclic data at the cycle T is divided.

For example, the number-of-access-times candidate-value setting section 41 derives the minimum value of the one-time transmission times $T_{ONE}1$ of the cyclic data depending on the size of the frame for transmitting the cyclic data and the transmission speed of the millimeter wave communication path. The size of the frame and the transmission speed are reported from, for example, the PCP, or set for each application. The number-of-access-times candidate-value setting section 41 derives the maximum number of access times N1max at the cycle T depending on the minimum value of the one-time transmission times $T_{ONE}1$ of the cyclic data.

The number-of-access-times candidate-value setting section 41 may sequentially set, as the candidate values of the number of access times N1, integer values, for example, from "1" to the maximum number of access times N1max, or may sequentially set integer values from the maximum number of access times N1max to "1".

The one-time transmission time derivation section 43 derives the one-time transmission times $T_{ONE}2$ of the cyclic data on the basis of the candidate values of the number of access times N1 having been set by the number-of-access-times candidate-value setting section 41.

For example, first, the one-time transmission time derivation section 43 divides the transmission time T3 shown in FIG. 3(C) by the number of access times N1 and derives the one-time transmission times $T_{ONE}1$. The one-time transmission times $T_{ONE}1$ does not include the overhead time.

Then, the one-time transmission time derivation section 43 derives the one-time transmission times $T_{ONE}2$ in consideration of the overhead time in the EDCA. Since a random value is used for the backoff time CW included in the overhead time, the average value of the backoff time CW, for example, is used as the backoff time CW.

The first-channel occupation time derivation section 45 derives the channel occupation time T4 of the cyclic data. The channel occupation time T4 of the cyclic data is, for example, the result of the multiplication of the one-time transmission times $T_{ONE}2$ and the number of access times N1.

Figure 5:
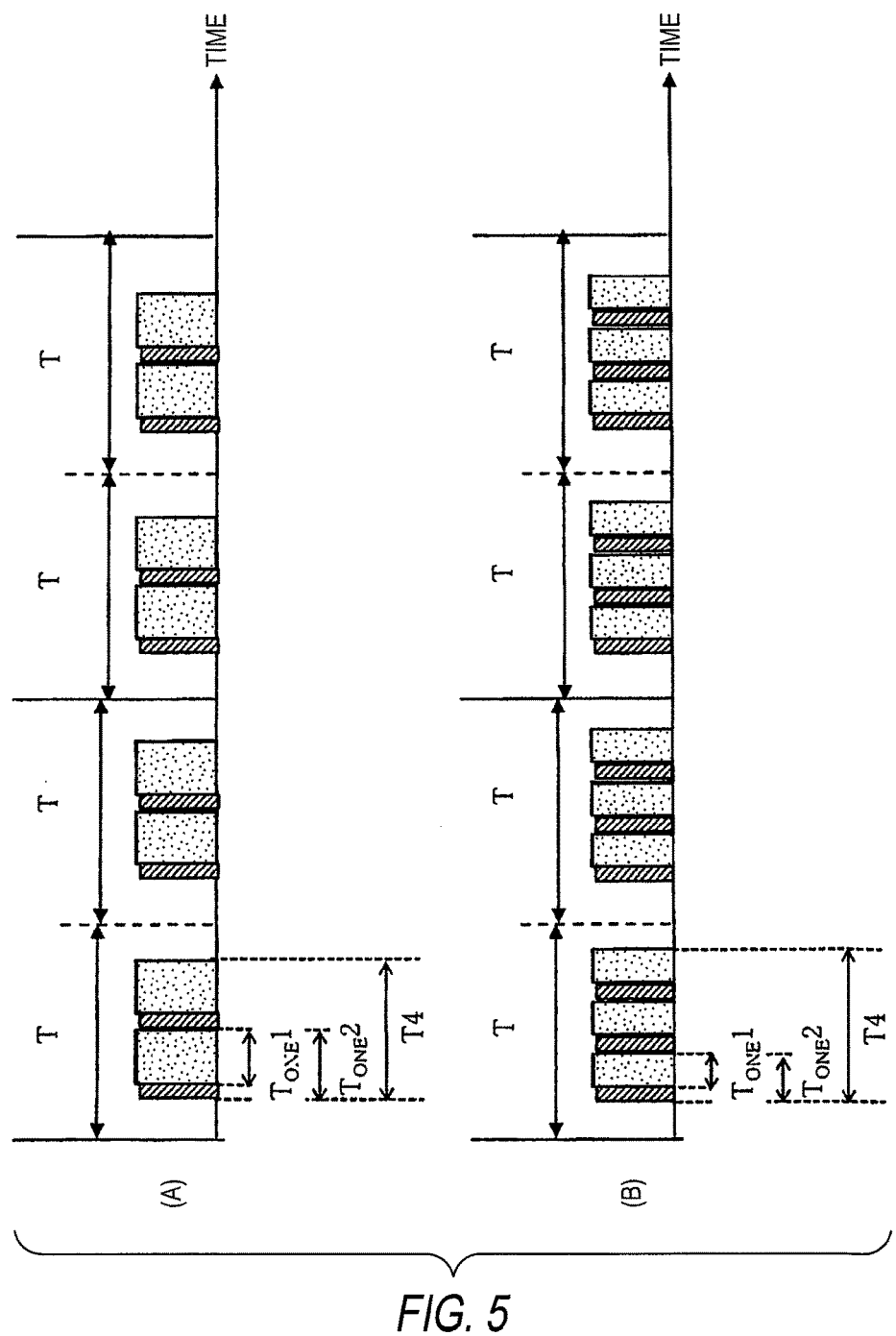
FIGS. 5(A) and 5(B) are schematic diagrams showing examples of transmission patterns including cyclic data according to the first embodiment.

FIGS. 5(A) and 5(B) are schematic diagrams showing examples of different transmission patterns of the cyclic data. FIG. 5(A) shows a case in which the number of access times N1 is two, and FIG. 5(B) shows a case in which the number of access times N1 is three. Each of FIGS. 5(A) and 5(B) shows the one-time transmission times $T_{ONE}1$, the one-time transmission times $T_{ONE}2$ and the channel occupation time T4.

Next, the details of the acyclic data transmission pattern setting section 23 will be described.

Figure 6:
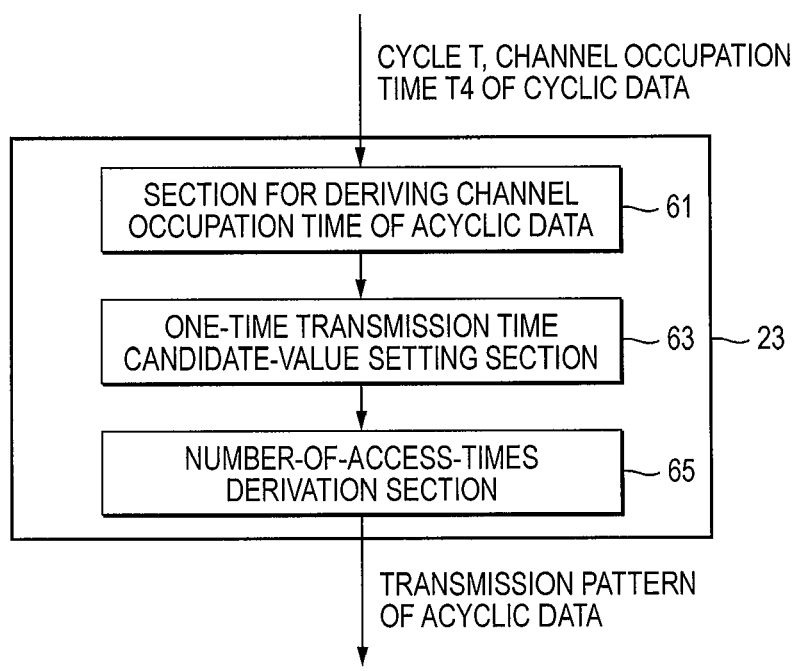
FIG. 6 is a block diagram showing a configuration example of an acyclic data transmission pattern setting section according to the first embodiment.

FIG. 6 is a block diagram showing a configuration example of the acyclic data transmission pattern setting section 23. The acyclic data transmission pattern setting section 23 includes a second channel occupation time derivation section 61, a one-time transmission time candidate-value setting section 63, and a number-of-access-times derivation section 65.

The second channel occupation time derivation section 61 acquires information on the cycle T and the channel occupation time T4 of the cyclic data from the cyclic data transmission pattern setting section 22. The second channel occupation time derivation section 61 derives the channel occupation time T5 of the acyclic data at the cycle T. The channel occupation time T5 of the acyclic data is, for example, the remaining time obtained by removing the channel occupation time T4 of the cyclic data from the cycle T.

The one-time transmission time candidate-value setting section 63 derives the candidate values of the one-time transmission times $T_{ONE}3$ of the acyclic data. For example, the one-time transmission time candidate-value setting section 63 derives the one-time transmission times $T_{ONE}3$ of the acyclic data depending on the size of the frame for transmitting the acyclic data and the transmission speed of the millimeter wave communication path. Then, the one-time transmission time candidate-value setting section 63 derives the maximum value of the number of transmission frames by one time of access. Then, the one-time transmission time candidate-value setting section 63 sequentially sets the candidate values of the one-time transmission times $T_{ONE}3$ of the acyclic data corresponding to the candidate values of the number of transmission frames.

The one-time transmission time candidate-value setting section 63 may sequentially set the candidate values of the one-time transmission times $T_{ONE}3$ of the acyclic data, for example, at equal time intervals, and may perform setting intensively and finely, for example, around the candidate value evaluated high in communication effect.

In addition, the one-time transmission time candidate-value setting section 63 may perform fixing so that the acyclic data is transmitted in one frame by one time of access and may set the transmission time corresponding to one frame, as in the recommended values corresponding to the EDCA parameters in IEEE802.11e standard.

The number-of-access-times derivation section 65 derives one-time transmission times $T_{ONE}4$ obtained by adding the overhead time of the acyclic data to the candidate value of the one-time transmission time $T_{ONE}3$ of the acyclic data and then derives the number of access times N2 according to the one-time transmission times $T_{ONE}4$. Since the acyclic data is lower than the cyclic data in priority in many cases, the overhead time of the acyclic data is longer than the overhead time of the cyclic data in many cases.

Figure 7:
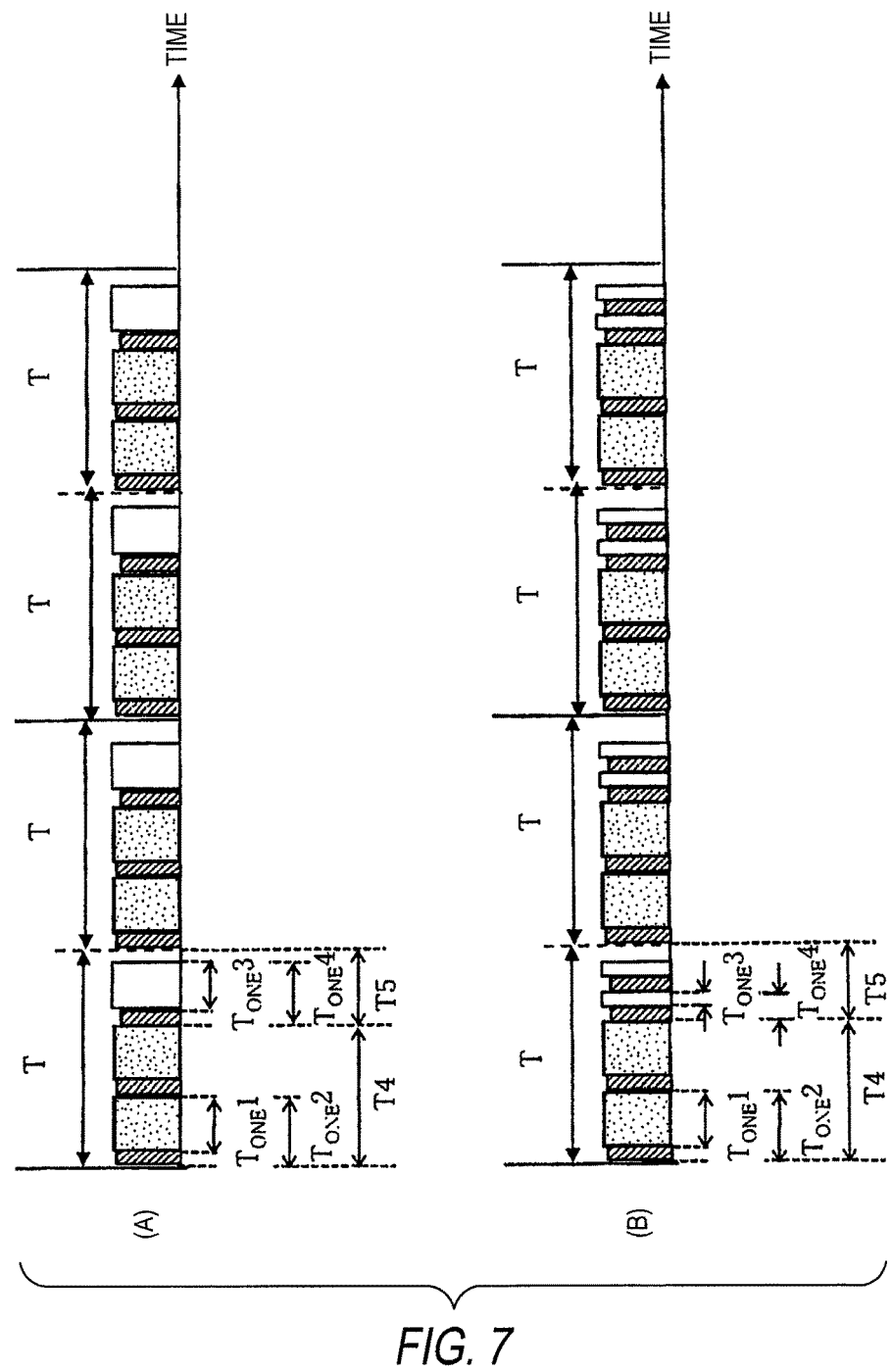
FIGS. 7(A) and 7(B) are schematic diagrams showing examples of transmission patterns including acyclic data according to the first embodiment.

FIGS. 7(A) and 7(B) are schematic diagrams showing examples of different transmission patterns for the cyclic data and the acyclic data. FIG. 7(A) shows a transmission pattern in the case that the number of access times N2 of the cyclic data is two and that the number of access times N2 of the acyclic data is one. FIG. 7(B) shows a transmission pattern in the case that the number of access times N2 of the cyclic data is two and that the number of access times N2 of the acyclic data is two.

Next, an operation example of the transmission apparatus 10 will be described.

Figure 8:
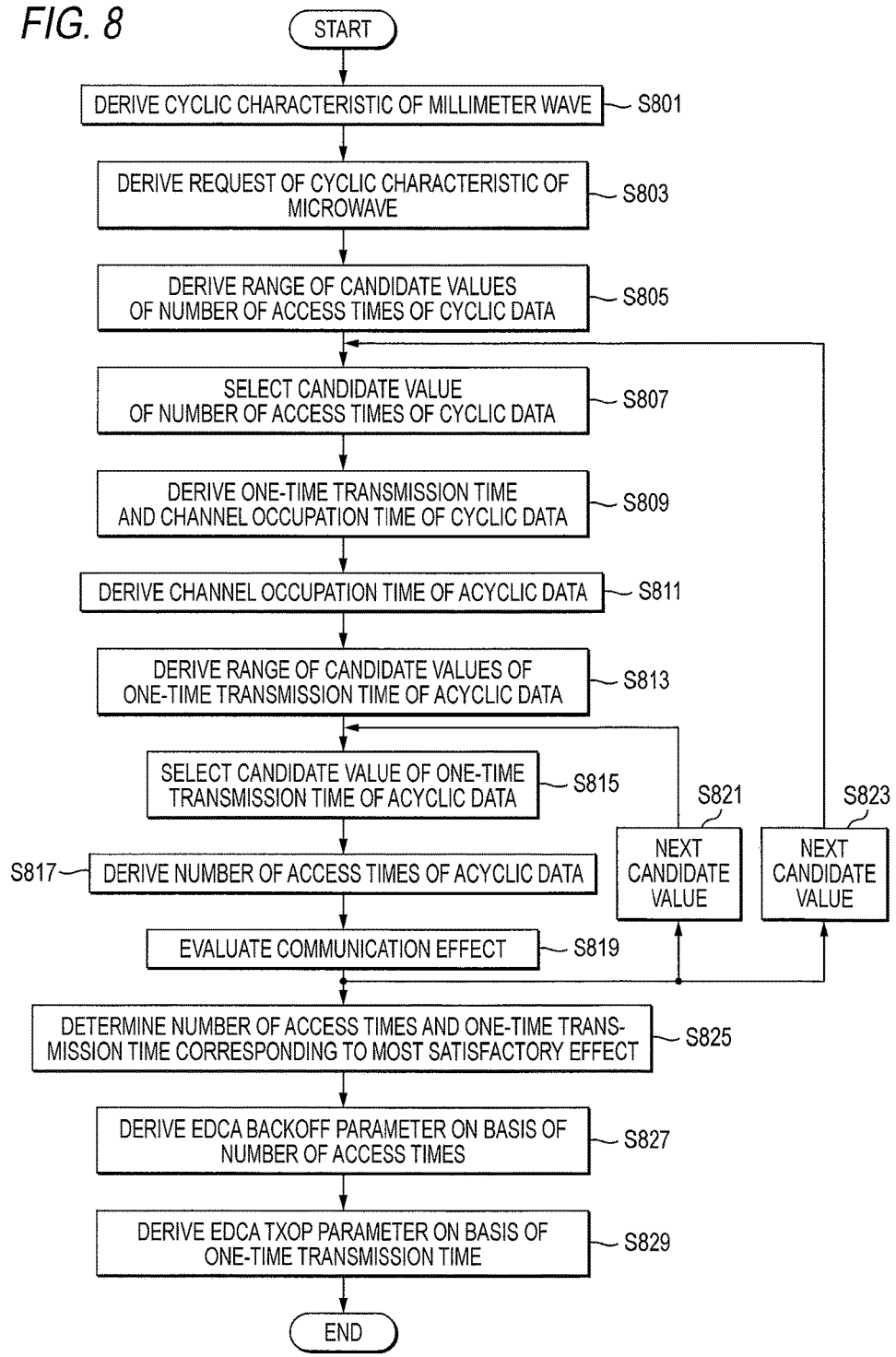
FIG. 8 is a flow chart showing the operation example of the transmission apparatus according to the first embodiment.

FIG. 8 is a flow chart showing the operation example of the transmission apparatus 10.

First, at S801, the cyclic characteristic acquisition section 21 derives the cyclic characteristic of the millimeter wave communication path before the switching from millimeter wave communication to microwave communication.

Next, at S803, the cyclic characteristic acquisition section 21 derives the request of the cyclic characteristic for the microwave communication path in consideration of the transmission speed of millimeter wave communication and the transmission speed of microwave communication.

Then, at S805, the cyclic data transmission pattern setting section 22 derives the range of the number of accessible times to the communication channel when transmission is performed through the microwave communication path for the cyclic data. In other words, the cyclic data transmission pattern setting section 22 derives the maximum number of access times N1max at the cycle T. Hence, the number of accessible times is in the range from one to the maximum number of access times N1max.

Then, at S807, the cyclic data transmission pattern setting section 22 selects one of the candidate values from the range of the number of access times. Hence, at S819, the communication effects are evaluated in order of the candidate values of the number of access times N1 of the cyclic data.

Then, at S809, the cyclic data transmission pattern setting section 22 derives the one-time transmission time $T_{ONE}2$ of the cyclic data and the channel occupation time T4 of the cyclic data corresponding to the candidate value of the number of access times N1 of the cyclic data.

Then, at S811, the acyclic data transmission pattern setting section 23 derives the channel occupation time T5 of the acyclic data from the cycle T and the channel occupation time T4 of the acyclic data.

Then, at S813, the acyclic data transmission pattern setting section 23 derives the range of the candidate values of the one-time transmission times $T_{ONE}3$ of the acyclic data on the basis of the number of frames transmittable by one time of transmission.

Then, at S815, the acyclic data transmission pattern setting section 23 selects one candidate value from the range of the candidate values of the one-time transmission times $T_{ONE}3$ of the acyclic data. Hence, at S819, the communication effect is evaluated at each one-time transmission time $T_{ONE}4$ of the acyclic data.

Then, at S817, the acyclic data transmission pattern setting section 23 derives the number of access times N2 of the acyclic data corresponding to the one-time transmission time $T_{ONE}4$ of the acyclic data.

Then, at S819, the effect evaluation section 24 evaluates the communication effects with respect to the transmission patterns (for example, the numbers of access times N1 and N2 and the one-time transmission times $T_{ONE}2$ and $T_{ONE}4$) of the respective cyclic data and acyclic data.

Then, at S821, the acyclic data transmission pattern setting section 23 sets the next candidate value as the candidate value of the one-time transmission time $T_{ONE}3$ of the acyclic data.

Then, at S823, the cyclic data transmission pattern setting section 22 sets the next candidate value as the candidate value of the number of access times N1 of the cyclic data.

Then, at S825, the transmission pattern determination section 25 compares the communication effects with respect to all the candidate values, that is, the candidate values of the number of access times N1 of the cyclic data and the candidate values of the one-time transmission time $T_{ONE}3$ of the acyclic data. The transmission pattern determination section 25 determines the numbers of access times N1 and N2 and the one-time transmission times $T_{ONE}2$ and $T_{ONE}4$ of the cyclic data and the acyclic data having been evaluated to be most satisfactory in communication effect. Furthermore, the transmission pattern determination section 25 may determine the numbers of access times N1 and N2 and the one-time transmission times $T_{ONE}2$ and $T_{ONE}4$ of the cyclic data and the acyclic data having been evaluated such that the communication effect has a predetermined level or more, although the communication effect is not most satisfactory Then, at S827, the parameter derivation section 26 derives the CWmin of the EDCA parameter to be used for the acyclic data by using, for example, (Expression 1) on the basis of the determined number of access times N1 of the cyclic data and the determined number of access times N2 of the acyclic data.

Then, at S829, the parameter derivation section 26 derives the TXOP of the EDCA parameter to be used for the cyclic data on the basis of the one-time transmission times $T_{ONE}1$ of the cyclic data. Furthermore, the parameter derivation section 26 derives the TXOP of the EDCA parameter to be used for the acyclic data on the basis of the one-time transmission times $T_{ONE}3$ of the acyclic data.

Next, the microwave transmission section 15 performs transmission via the microwave communication path using the derived EDCA parameters. Moreover, the microwave transmission section 15 transmits the derived EDCA parameters to the access point. Hence, the communication apparatus under the control of the access point, including the transmission apparatus 10, can share and use the EDCA parameters.

With the transmission apparatus 10, in the case that millimeter wave communication is switched to microwave communication, the request (for example, a request for real-time communication) of the cyclic characteristic of microwave communication after the switching can be derived from the cyclic characteristic of the millimeter wave communication before the switching, and the transmission parameters to be used after the switching can be set adaptively. Hence, the real-time characteristic of the real-time communication can be ensured although the band allocation method before the switching is different from that after the switching. In addition, non-real-time communication can also be ensured in response to the request of the cyclic characteristic of microwave communication. Hence, even in the case that millimeter wave communication is switched to microwave communication, communication quality can be maintained and communication quality can be improved.

In this embodiment, a method in which communication traffic streams are divided into two types, cyclic data and acyclic data, and transmitted has been described. However, without being limited to this method, the access category corresponding to the cyclic data may be either AC_VI or AC_VO. Furthermore, the access category corresponding to the acyclic data may be either AC_BE or AC_BK.

In addition, in the transmission apparatus 10, the communication for all the communication traffic streams may be switched from millimeter wave communication to microwave communication. Furthermore, in the transmission apparatus 10, the communication for only part of communication traffic streams may be switched from millimeter wave communication to microwave communication. Hence, selection is possible between the execution of only millimeter wave transmission and the simultaneous execution of millimeter wave transmission and microwave transmission.

Second Embodiment

In the first embodiment, a system in which communication traffic streams after the switching are divided into two types, cyclic data and acyclic data, and transmitted has been described. In this embodiment, a system in which traffic streams including a plurality of data types are further present in the cyclic data or the acyclic data and the traffic streams are processed separately is described.

Figure 9:
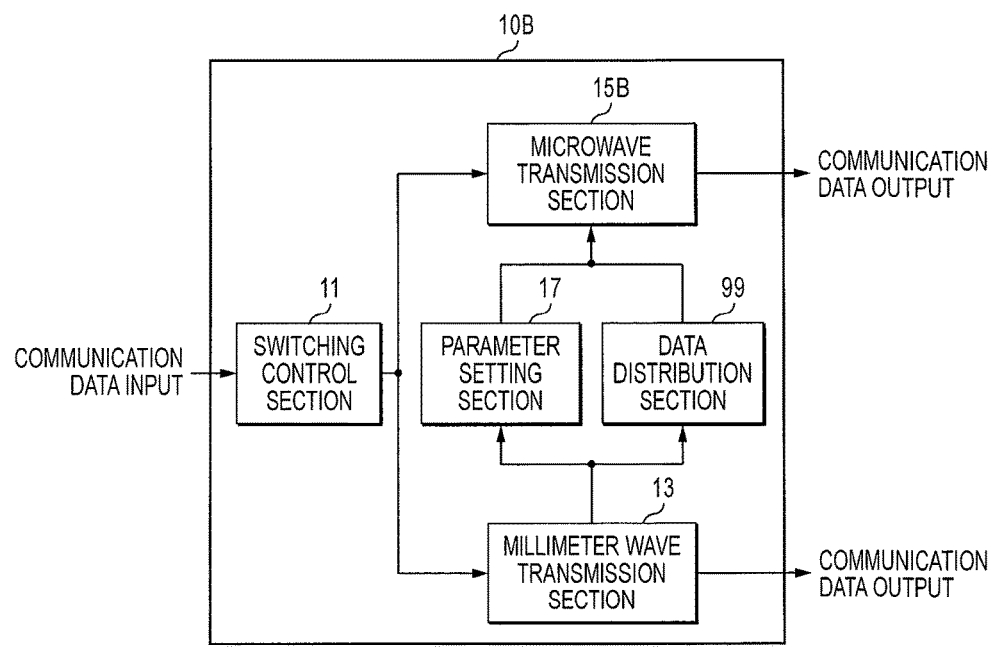
FIG. 9 is a block diagram showing a configuration example of a transmission apparatus according to a second embodiment.

FIG. 9 is a block diagram showing a configuration example of a transmission apparatus 10B according to the second embodiment. The transmission apparatus 10B is equipped with the switching control section 11, the millimeter wave transmission section 13, a microwave transmission section 15B, the parameter setting section 17, and a data distribution section 99. In the transmission apparatus 10B shown in FIG. 9, the same components as those of the transmission apparatus 10 shown in FIG. 1 are designated by the same reference numerals and their descriptions are omitted or simplified.

When the transmission apparatus 10B is compared with the transmission apparatus 10, the data distribution section 99 is added and the microwave transmission section 15B is modified.

The data distribution section 99 controls, for example, the transmission sequence or the transmission amount for each type (for example, the access category of EDCA parameters) of communication data. Communication traffic streams include, for example, four types of communication data in which the access categories of the EDCA parameters are AC_VI, AC_VO, AC_BE and AC_BK.

The data distribution section 99 classifies communication data into the four types of access categories. In this case, for example, a transmission pattern is set, a communication effect is evaluated, and EDCA parameters are derived for each access category.

The communication data in the access categories of AC_VI and AC_VO is cyclic data and is transmitted within the transmission time corresponding to the TXOP serving as an EDCA parameter to be used for the cyclic data. Furthermore, the communication data in the access categories of AC_BE and AC_BK is acyclic data and is transmitted within the transmission time corresponding to the TXOP serving as an EDCA parameter to be used for the acyclic data.

The data distribution section 99 may instruct, for example, the parameter setting section 17 to allocate 80% of the transmission time of the cyclic data to AC_VI and to allocate 20% of the transmission time of the cyclic data to the communication data of AC_VO. Furthermore, the data distribution section 99 may instruct, for example, the parameter setting section 17 to transmit the communication data of AC_VI first and to transmit the communication data of AC_VO later. Hence, setting can be made so that communication data having a large transmission amount or having high importance is transmitted first or so that the reliability of transmission is higher. Moreover, the same also applies to AC_BE and AC_BK, although the detailed descriptions thereof are omitted.

With the transmission apparatus 10B, the transmission pattern is set and the EDCA parameters are set for each type of the communication data included in the communication traffic streams. Consequently, the band allocation method can be finely set for each type of communication data, and communication efficiency can be improved.

Third Embodiment

In the first embodiment, a system in which the cycle T at which cyclic data appears or the transmission amount at the cycle T is fixed has been described. In this embodiment, a system in which a plurality of cycles T or a plurality of transmission amounts at the cycles T are derived, and either is set according to the transmission situation after the switching is described.

Figure 10:
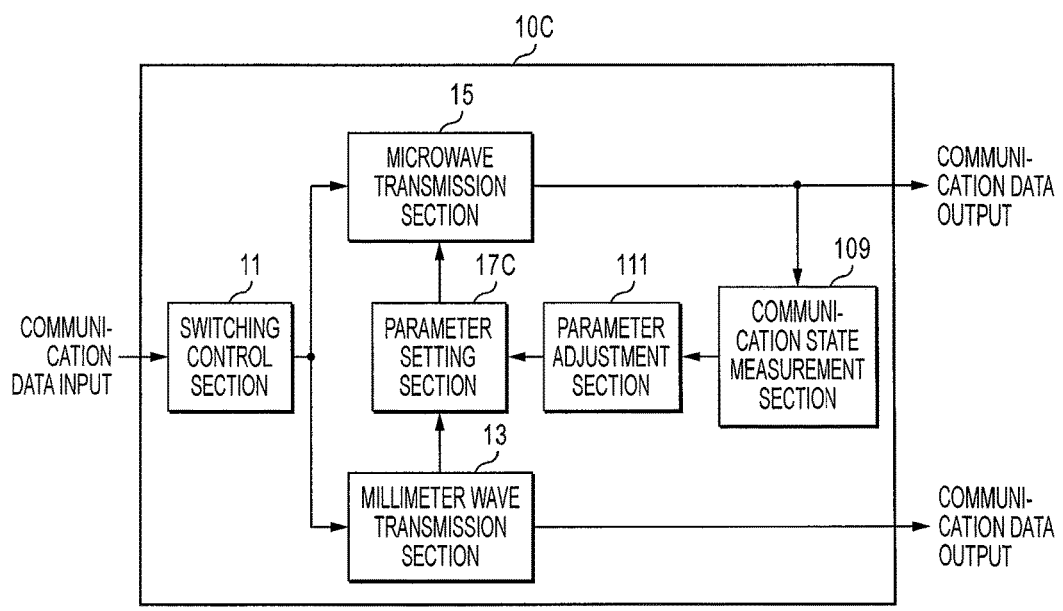
FIG. 10 is a block diagram showing a configuration example of a transmission apparatus according to a third embodiment.

FIG. 10 is a block diagram showing a configuration example of a transmission apparatus 10C according to the third embodiment. The transmission apparatus 10C is equipped with the switching control section 11, the millimeter wave transmission section 13, the microwave transmission section 15, a parameter setting section 17C, a communication state measurement section 109, and a parameter selection section 111. In the transmission apparatus 10C shown in FIG. 10, the same components as those of the transmission apparatus 10 shown in FIG. 1 are designated by the same reference numerals and their descriptions are omitted or simplified.

When the transmission apparatus 10C is compared with the transmission apparatus 10, the communication state measurement section 109 and the parameter selection section 111 are added, and the parameter setting section 17C is modified.

The parameter setting section 17C derives the cycles T or a plurality of parameter groups and store them in memory, not shown. In the first embodiment, one EDCA parameter corresponding to the transmission pattern having been evaluated most satisfactory in communication effect is set. On the other hand, the parameter setting section 17C uses all or part of the transmission patterns derived by the cyclic data transmission pattern setting section 22 or the acyclic data transmission pattern setting section 23 and derives a plurality of EDCA parameters corresponding to the respective transmission patterns. As parameter groups, the derived plurality of EDCA parameters are stored.

The communication state measurement section 109 measures the communication state (for example, physical transmission speed) of the microwave communication path after the switching by the switching control section 11 and gives notice to the parameter selection section 111.

On the basis of the measured communication state, the parameter selection section 111 selects an appropriate parameter group from among the plurality of parameter groups. For example, the parameter selection section 111 evaluates the communication effects with respect to the transmission patterns corresponding to the plurality of parameter groups derived by the parameter setting section 17C in consideration of the measured communication state. The parameter selection section 111 sets parameters corresponding to the transmission pattern evaluated most satisfactory in communication effect.

With the transmission apparatus 10C, a plurality of candidate values of the EDCA parameters are generated before communication switching, and the EDCA parameters suited for the communication state can be set after communication switching. Hence, the setting is possible to the EDCA parameters actually suited for the communication state after communication switching, whereby communication quality can be improved.

The second embodiment may be combined with the third embodiment.

The present disclosure is not limited to the configurations of the above-mentioned embodiments, but is applicable to any configurations, provided that the functions described in the claims or the functions of the configurations of the embodiments can be attained.

In the above-mentioned embodiments, a case in which the present disclosure is formed of hardware is taken as an example and has been described; however, the present disclosure can also be implemented in software in cooperation with hardware.

In addition, the respective function blocks described in the above-mentioned embodiments are typically implemented by LSIs serving as integrated circuits. These may be formed into a single chip individually, or may be formed into a single chip so that part or all thereof are included. The integrated circuit may herein be referred to as an LSI or may be referred to as an IC, a system IC, a super LSI or an ultra LSI according to the difference in integration degree.

Furthermore, the method for circuit integration is not limited to LSI, but may be implemented using a dedicated circuit or a general-purpose processor. For example, it may be possible to use FPGA (Field Programmable Gate Array), circuit cells connected inside an LSI or a configurable processor in which setting can be reconfigured.

Moreover, if a circuit integration technology for replacing LSIs is developed because of the advance in semiconductor technology or other technologies derived therefrom, the technology may be used for the integration of the function blocks, as a matter of course. For example, the application of biotechnology is possible.

(General Description of an Embodiment According to the Present Disclosure

A first transmission apparatus according to the present disclosure is equipped with:

a first transmission section for transmitting communication data using a first communication path in which band control is performed using a dedicated band and an undedicated band, a second transmission section for transmitting communication data using a second communication path in which priority control is performed depending on the priority of communication data, a switching control section for performing switching between the transmission using the first transmission section and the transmission using the second transmission section, and a parameter setting section for setting communication parameters for performing communication using the second communication path in the case that switching is performed by the switching control section from the transmission using the first transmission section to the transmission using the second transmission section.

A second transmission apparatus according to the present disclosure is the first transmission apparatus, wherein the parameter setting section is equipped with:

a transmission pattern derivation section for deriving, from the communication data, the transmission patterns of cyclic data transmitted cyclically, and for deriving, from the communication data, the transmission patterns of acyclic data transmitted acyclically, and a parameter derivation section for deriving the communication parameters on the basis of the transmission patterns of the cyclic data and the transmission patterns of the acyclic data derived by the transmission pattern derivation section.

A third transmission apparatus according to the present disclosure is the second transmission apparatus, wherein the parameter setting section is equipped with an effect evaluation section for evaluating communication effects with respect to the transmission patterns derived by the transmission pattern derivation section, the transmission pattern derivation section derives a plurality of transmission patterns of the cyclic data and a plurality of transmission patterns of the acyclic data, the effect evaluation section evaluates the communication effect with respect to each transmission pattern, and the parameter derivation section derives the communication parameters corresponding to the transmission patterns in which the communication effects evaluated by the effect evaluation section are equal to or more than a predetermined effect.

A fourth transmission apparatus according to the present disclosure is the second or third transmission section, wherein the transmission pattern derivation section derives the transmission patterns of the cyclic data on the basis of the number of access times of the cyclic data to a communication channel and the transmission time of the cyclic data per access.

A fifth transmission apparatus according to the present disclosure is any one of the second to fourth transmission apparatuses, wherein the transmission pattern derivation section derives the transmission patterns of the acyclic data on the basis of the number of access times of the acyclic data to the communication channel and the transmission time of the acyclic data per access.

A sixth transmission apparatus according to the present disclosure is the fourth or fifth transmission apparatus, wherein the parameter derivation section derives the TXOP (Transmission Opportunity) of the EDCA parameter to be used for the cyclic data or the acyclic data on the basis of the transmission time of the cyclic data or the acyclic data derived by the transmission pattern derivation section.

A seventh transmission apparatus according to the present disclosure is any one of the fourth to sixth transmission apparatuses, wherein the parameter derivation section derives the CWmin (Contention Window min) of the EDCA parameter to be used for the acyclic data on the basis of the number of access times of the cyclic data and the number of access times of the acyclic data.

An eighth transmission apparatus according to the present disclosure is any one of the second to seventh transmission apparatuses, wherein the parameter setting section is equipped with a data distribution section for classifying the cyclic data or the acyclic data according to a plurality of data types.

A ninth transmission apparatus according to the present disclosure is any one of the second to eighth transmission apparatuses, wherein the parameter setting section derives at least a plurality of transmission cycles in which the cyclic data is transmitted or the plurality of communication parameters corresponding to the transmission cycles before the switching by the switching control section, and sets at least the transmission cycles or the communication parameters corresponding to the transmission cycles according to the communication state of the second communication path after the switching by the switching control section.

A tenth transmission apparatus according to the present disclosure is any one of the second to ninth transmission apparatuses, wherein the first communication path is a millimeter wave communication path.

An 11th transmission apparatus according to the present disclosure is any one of the second to tenth transmission apparatuses, wherein the second communication path is a microwave communication path.

A 12th transmission apparatus according to the present disclosure is any one of the second to 11th transmission apparatuses, wherein the switching control section performs switching to transmission of all of the communication data using the second transmission section or to transmission of part of the communication data using the second transmission section.

A 13th transmission apparatus according to the present disclosure is any one of the second to ninth transmission apparatuses, wherein the cyclic data is communication data in which the access category of the EDCA parameters is AC_VI (Access Category_Video) or AC_VO (Access Category_Voice).

A 14th transmission apparatus according to the present disclosure is any one of the second to ninth transmission apparatuses, wherein the acyclic data is communication data in which the access category of the EDCA parameters is AC_BE (Access Category_Best Effort) or AC_BK (Access Category_Background).

A transmission method in a transmission apparatus according to the present disclosure has:

a step of transmitting communication data using a first communication path in which band control is performed using a dedicated band and an undedicated band, a step of transmitting communication data using a second communication path in which priority control is performed depending on the priority of communication data, a step of performing switching between the transmission using the first transmission path and the transmission using the second transmission path, and a step of setting communication parameters for performing communication using the second communication path in the case that switching is performed from the transmission using the first communication path to the transmission using the second communication path.

Although the present invention has been described in detail referring to the specific embodiments, it is obvious to those skilled in the art that various changes and modifications can be made without departing from the spirit and scope of the present invention.

This application is based on Japanese Patent Application No. 2013-050666 filed on Mar. 13, 2013, the contents of which are hereby incorporated by reference.

INDUSTRIAL APPLICABILITY

The present disclosure is useful for a transmission apparatus and a transmission method capable of improving communication quality in the case that millimeter wave communication is switched to microwave communication.

DESCRIPTION OF REFERENCE NUMERALS AND SIGNS 10, 10B, 10C transmission apparatus
11 switching control section
13 millimeter wave transmission section
15, 15B microwave transmission section
17, 17C parameter setting section
21 cyclic characteristic acquisition section
22 cyclic data transmission pattern setting section
23 acyclic data transmission pattern setting section
24 effect evaluation section
25 transmission pattern determination section
26 parameter derivation section 41 number-of-access-times candidate-value setting section
43 one-time transmission time derivation section
45 first-channel occupation time derivation section
61 second channel occupation time derivation section
63 one-time transmission time candidate-value setting section
65 number-of-access-times derivation section
99 data distribution section
109 communication state measurement section
111 parameter selection section

The invention claimed is:

1. A transmission apparatus comprising:
a first transmission section that transmits communication data through a first communication path using a period in which cyclic data is transmitted among the communication data and a period in which acyclic data is transmitted among the communication data, the cyclic data being transmitted cyclically and the acyclic data being transmitted acyclically;
a second transmission section that transmits the communication data through a second communication path by performing priority control depending on the priority of the communication data;
a switching control section that performs switching between the transmission using the first transmission section and the transmission using the second transmission section; and
a parameter setting section that sets communication parameters for the second transmission section in the case that switching is performed by the switching control section from the transmission using the first transmission section to the transmission using the second transmission section, the parameter setting section including:
a transmission pattern derivation section that derives, from the communication data transmitted using the first transmission section, transmission patterns of the cyclic data transmitted cyclically, and that derives, from the communication data transmitted using the first transmission section, transmission patterns of the acyclic data transmitted acyclically; and
a parameter derivation section that derives the communication parameters on the basis of the transmission patterns of the cyclic data and the transmission patterns of the acyclic data derived by the transmission pattern derivation section, the communication parameters indicating to allocate a band to the cyclic data prior to the acyclic data.

2. The transmission apparatus according to claim 1, wherein the parameter setting section comprises an effect evaluation section that evaluates communication effects with respect to the transmission patterns derived by the transmission pattern derivation section;
wherein the transmission pattern derivation section derives a plurality of transmission patterns of the cyclic data and a plurality of transmission patterns of the acyclic data;
wherein the effect evaluation section evaluates the communication effect with respect to each of the transmission patterns; and
wherein the parameter derivation section derives the communication parameters corresponding to the transmission patterns in which the communication effects evaluated by the effect evaluation section are equal to or more than a predetermined effect.

3. The transmission apparatus according to claim 1, wherein the transmission pattern derivation section derives the transmission patterns of the cyclic data on the basis of the number of access times of the cyclic data to a communication channel and the transmission time of the cyclic data per access.

4. The transmission apparatus according to claim 3, wherein the parameter derivation section derives a TXOP (Transmission Opportunity) of a EDCA parameter to be used for the cyclic data or the acyclic data on the basis of the transmission time of the cyclic data or the acyclic data derived by the transmission pattern derivation section.

5. The transmission apparatus according to claim 3, wherein the parameter derivation section derives a CWmin (Contention Window min) of a EDCA parameter to be used for the acyclic data on the basis of the number of access times of the cyclic data and the number of access times of the acyclic data.

6. The transmission apparatus according to claim 1, wherein the transmission pattern derivation section derives the transmission patterns of the acyclic data on the basis of the number of access times of the acyclic data to the communication channel and the transmission time of the acyclic data per access.

7. The transmission apparatus according to claim 6, wherein the parameter derivation section derives a TXOP (Transmission Opportunity) of a EDCA parameter to be used for the cyclic data or the acyclic data on the basis of the transmission time of the cyclic data or the acyclic data derived by the transmission pattern derivation section.

8. The transmission apparatus according to claim 6, wherein the parameter derivation section derives a CWmin (Contention Window min) of a EDCA parameter to be used for the acyclic data on the basis of the number of access times of the cyclic data and the number of access times of the acyclic data.

9. The transmission apparatus according to claim 1, wherein the parameter setting section comprises a data distribution section that classifies the cyclic data or the acyclic data according to a plurality of data types.

10. The transmission apparatus according to claim 1, wherein the parameter setting section derives at least a plurality of transmission cycles in which the cyclic data is transmitted or the plurality of communication parameters corresponding to the transmission cycles before the switching by the switching control section, and sets at least the transmission cycles or the communication parameters corresponding to the transmission cycles according to the communication state of the second communication path after the switching by the switching control section.

11. The transmission apparatus according to claim 1, wherein the first communication path is a millimeter wave communication path.

12. The transmission apparatus according to claim 1, wherein the second communication path is a microwave communication path.

13. The transmission apparatus according to claim 1, wherein the switching control section performs switching to transmission of all of the communication data using the second transmission section or to transmission of part of the communication data using the second transmission section.

14. The transmission apparatus according to claim 1, wherein the cyclic data is communication data in which the access category of EDCA parameters is AC_VI (Access Category_Video) or AC_VO (Access Category_Voice).

15. The transmission apparatus according to claim 1, wherein the acyclic data is communication data in which the access category of EDCA parameters is AC_BE (Access Category_Best Effort) or AC_BK (Access Category_BacKground).

16. A transmission method in a transmission apparatus, comprising:
- a step of transmitting communication data through a first communication path using a period in which cyclic data is transmitted among communication data and a period in which acyclic data is transmitted among the communication data, the cyclic data being transmitted cyclically and the acyclic data being transmitted acyclically;
- a step of transmitting the communication data through a second communication path by performing in which priority control depending on the priority of the communication data;
- a step of performing switching between the transmission using the first transmission path and the transmission using the second transmission path; and
- a step of setting communication parameters for the second transmission section in the case that switching is performed from the transmission using the first communication path to the transmission using the second communication path, the step of setting the communication parameters including:
- a step of deriving, from the communication data transmitted through the first communication path, transmission patterns of the cyclic data transmitted cyclically;
- a step of deriving, from the communication data transmitted through the first communication path, transmission patterns of the acyclic data transmitted acyclically; and
- a step of deriving the communication parameters on the basis of the transmission patterns of the cyclic data and the transmission patterns of the acyclic data derived by the transmission pattern derivation section, the communication parameters indicating to allocate a band to the cyclic data prior to the acyclic data.

* * * * *